(12) United States Patent
Goodwin et al.

(10) Patent No.: US 7,689,537 B2
(45) Date of Patent: Mar. 30, 2010

(54) METHOD, SYSTEM, AND COMPUTER PROGRAM PRODUCT FOR ENHANCING COLLABORATION USING A CORPORATE SOCIAL NETWORK

(75) Inventors: Richard T. Goodwin, Dobbs Ferry, NY (US); Anand Ranganathan, Palatine, IL (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 11/200,912

(22) Filed: Aug. 10, 2005

(65) Prior Publication Data

US 2007/0038594 A1    Feb. 15, 2007

(51) Int. Cl.
G06F 7/00 (2006.01)
G06F 17/30 (2006.01)

(52) U.S. Cl. .................. 707/2; 707/3; 707/4; 707/5; 707/103 R

(58) Field of Classification Search ............ None
See application file for complete search history.

(56) References Cited

U.S. PATENT DOCUMENTS

| | | | | |
|---|---|---|---|---|
| 6,675,166 | B2* | 1/2004 | Bova | 707/10 |
| 7,051,012 | B2* | 5/2006 | Cole et al. | 707/2 |
| 7,472,110 | B2* | 12/2008 | Achlioptas | 707/3 |
| 7,512,612 | B1* | 3/2009 | Akella et al. | 707/101 |
| 2004/0148275 | A1* | 7/2004 | Achlioptas | 707/3 |
| 2005/0171955 | A1* | 8/2005 | Hull et al. | 707/10 |
| 2005/0188299 | A1* | 8/2005 | Furman et al. | 715/513 |
| 2005/0198031 | A1* | 9/2005 | Pezaris et al. | 707/9 |
| 2005/0209999 | A1* | 9/2005 | Jou | 707/2 |
| 2005/0283753 | A1* | 12/2005 | Ho et al. | 717/102 |
| 2006/0004892 | A1* | 1/2006 | Lunt et al. | 707/204 |
| 2006/0031203 | A1* | 2/2006 | Rosenbaum et al. | 707/3 |
| 2006/0218111 | A1* | 9/2006 | Cohen | 706/45 |
| 2006/0259957 | A1* | 11/2006 | Tam et al. | 726/3 |
| 2006/0271460 | A1* | 11/2006 | Hanif | 705/35 |
| 2006/0271564 | A1* | 11/2006 | Meng Muntz et al. | 707/100 |
| 2006/0294086 | A1* | 12/2006 | Rose et al. | 707/3 |
| 2008/0222170 | A1* | 9/2008 | Farnham et al. | 707/100 |

OTHER PUBLICATIONS

Identity and Search in Social Networks, by Duncan J. Watts et al., Science May 17, 2002: vol. 296. No. 5571, pp. 1302-1305.*

* cited by examiner

*Primary Examiner*—Tim T. Vo
*Assistant Examiner*—Jay A Morrison
(74) *Attorney, Agent, or Firm*—Brian Verminski; Hoffman Warnick LLC

(57) ABSTRACT

The present invention provides a method, system, and computer program product for enhancing collaboration using a corporate social network to infer contacts. A method in accordance with an embodiment of the present invention includes: providing a social network for an organization, the social network including a plurality of nodes and links, wherein each node represents a member of the organization, and wherein each link represents a relationship between a pair of the nodes; receiving a request by a requesting member of the organization for a required type of contact; and inferring a contact to the requesting member by searching the social network along a plurality of dimensions from the node representing the requesting member.

14 Claims, 6 Drawing Sheets

METHOD, SYSTEM, AND COMPUTER PROGRAM PRODUCT FOR ENHANCING COLLABORATION USING A CORPORATE SOCIAL NETWORK

BACKGROUND OF THE INVENTION

1. Field of the Invention

The present invention generally relates to contact management, and more specifically relates to a method, system, and computer program product for enhancing collaboration using a corporate social network to infer contacts.

2. Related Art

In any large organization, such as a university, company, or government, employees or other members of the organization have to collaborate with a wide variety of people in order to perform different kinds of tasks. They collaborate with people, not only in their own group or department, but also in other departments, especially service departments such as Human Resources, Legal, Finance, Information Technology, Purchasing, Facilities, Public Relations, etc. These service departments often assign specific people to handle predefined tasks for predetermined groups of employees. However, this contact information is often not available explicitly to the employees making use of the services. As such, it becomes difficult for a person, especially a new employee, to find the right contact for performing a particular task or for answering a particular question. Typically, an employee will ask his/her peers, managers, or assistants for the right contact. This approach, however, may not always be efficient or lead to the correct person.

Existing corporate directories normally provide certain details about each employee, such as contact information and position. Some corporate directories also indicate the management chain in the organization (e.g., via an org chart). Other directories also have expertise and skill information and allow searching for employees with certain skills or expertise. However, there is a distinction between an expert in a certain kind of task and the right contact for the task. The right contact for a task may not be the foremost expert in that area. Instead, it is often someone who is assigned to help a certain group of employees to perform a certain kind of task. To illustrate the distinction, consider the situation where a light bulb has blown out in an employee's office. The employee does not need the company maintenance expert, but the maintenance person who covers their office.

Another problem with expertise and skill directories is that these directories often rely on individual employees to fill in the details, which they don't always do. Hence, such information is often incomplete and out-of-date.

There are two broad approaches to providing employees with contact information. The first is a centralized approach, wherein a certain entity in an organization maintains and provides the contact information for all employees in the organization. One problem with this approach is that it requires personnel to be dedicated to the task of creating and updating the contact information. Using this approach is difficult if the set of contact types or job responsibilities is a large and constantly changing set. The other approach for providing contact information is a decentralized approach, such as that provided by a social network. This type of system allows people to create links to their friends or acquaintances. Users can then explore and interact with people in the resulting social network. One advantage of social networks is that the information is created and maintained in a collaborative and distributed manner. These systems do not depend on a central authority to collect and maintain information about the relationships between people. Since there are a large number of people maintaining information about their contacts, the system tends to have fairly accurate and up-to-date information. Unfortunately, such informal social networks typically only allow relationships based on friendship (and its variants) and are thus not sufficient for use in a corporate environment where many different types of relationships may exist among employees.

SUMMARY OF THE INVENTION

The present invention provides a method, system, and computer program product for enhancing collaboration using a corporate social network to infer contacts.

A first aspect of the present invention is directed to a method for inferring a contact, comprising: providing a social network for an organization, the social network including a plurality of nodes and links, each node representing a member of the organization and each link representing a relationship between a pair of the nodes; receiving a request by a requesting member of the organization for a required type of contact; and inferring a contact to the requesting member by searching the social network along a plurality of dimensions from the node representing the requesting member.

A second aspect of the present invention is directed to a system for inferring a contact, comprising: a social network including a plurality of nodes and links, each node representing a member of the organization and each link representing a relationship between a pair of the nodes; a system for receiving a request by a requesting member of the organization for a required type of contact; and a system for inferring a contact to the requesting member by searching the social network along a plurality of dimensions from the node representing the requesting member.

A third aspect of the present invention is directed to a program product stored on a computer readable medium for inferring a contact, the computer readable medium comprising program code for performing the steps of: providing a social network for an organization, the social network including a plurality of nodes and links, each node representing a member of the organization and each link representing a relationship between a pair of the nodes; receiving a request by a requesting member of the organization for a required type of contact; and inferring a contact to the requesting member by searching the social network along a plurality of dimensions from the node representing the requesting member.

A fourth aspect of the present invention is directed to a method for deploying an application for inferring a contact, comprising: providing a computer infrastructure being operable to: provide a social network for an organization, the social network including a plurality of nodes and links, each node representing a member of the organization and each link representing a relationship between a pair of the nodes; receive a request by a requesting member of the organization for a required type of contact; and infer a contact to the requesting member by searching the social network along a plurality of dimensions from the node representing the requesting member.

A fifth aspect of the present invention is directed to computer software embodied in a propagated signal for inferring a contact, the computer software comprising instructions to cause a computer system to perform the following functions: provide a social network for an organization, the social network including a plurality of nodes and links, each node representing a member of the organization and each link representing a relationship between a pair of the nodes;

receive a request by a requesting member of the organization for a required type of contact; and infer a contact to the requesting member by searching the social network along a plurality of dimensions from the node representing the requesting member.

A sixth aspect of the present invention is directed to a contact inferring method, comprising: providing a corporate social network including a plurality of nodes and links, each node representing a member of the organization and each link representing a relationship between a pair of the nodes in one of a plurality of different dimensions; receiving a request by a requesting employee of the organization for a required type of contact; inferring at least one contact to the requesting employee by searching the corporate social network in increasing distance along the plurality of different dimensions from the node representing the requesting employee; accepting an inferred contact; and updating the corporate social network by adding a link from the node representing the requesting employee to a node representing the accepted inferred contact.

BRIEF DESCRIPTION OF THE DRAWINGS

These and other features of this invention will be more readily understood from the following detailed description of the various aspects of the invention taken in conjunction with the accompanying drawings in which.

Figure 1:
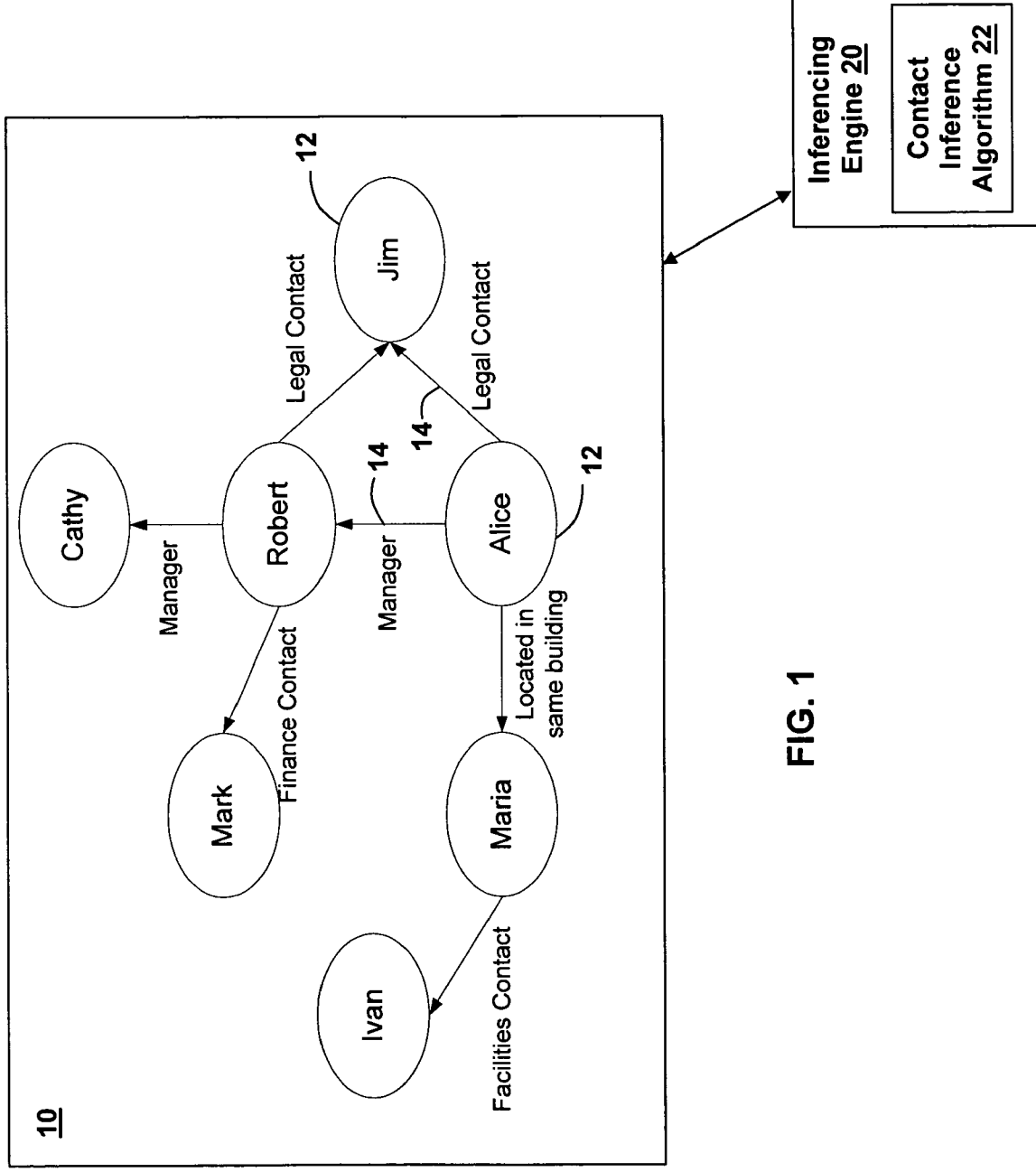
FIG. 1 depicts an illustrative corporate social network in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

The present invention provides a corporate social network that extends the idea of informal social networks into the corporate world. An illustrative corporate social network 10 in accordance with the present invention is depicted in FIG. 1. As shown, the nodes 12 in the corporate social network 10 represent different members (e.g., employees) of an organization. Each node 12 also includes personal information about the employee, including his or her name, location, employee-type, expertise, skills, qualifications, etc. The edges or links 14 in the corporate social network 10 represent relationships between employees. Although described in terms of a corporation and employees thereof, it will be apparent to one skilled in the art that the present invention can be used to enhance collaboration among the members of many different types of organization.

While informal social networks typically only allow relationships based on friendship (and its variants), a corporate social network 10 in accordance with the present invention allows a far richer variety of relationships between people in an organization. Examples of relationships can include, for example, "manager of;" "legal contact of;" "financial contact of;" "located in same building as," etc. Some of these relationships (such as "manager of") may be directly available from corporate directories. Other links may be obtained from hierarchies of different types of properties that characterize employees (such as location and employee type) or may be explicitly stated by employees. For example, an employee, Alice, can state that Jim is her legal contact, which means that she contacts Jim for any legal issues or tasks. Alice can then use her stated relationship as a bookmark to Jim. Still other links can be inferred by the present invention as probable contacts of an employee for certain kinds of tasks.

As shown in FIG. 1, the present invention provides an inferencing engine 20 for inferring probable contacts of different kinds to an employee, based on content (e.g., nodes 12 and links 14) of the corporate social network 10. Thus, when a new employee comes into the organization, he or she is immediately presented with a set (i.e., one or more) of probable contacts for different kinds of tasks.

The inferencing engine 20 employs a contact inference algorithm 22 that operates based on the fact that since contacts are normally assigned according to properties such as location, department or employee-type, searching the corporate social network 10 along these property dimensions increases the chances of finding the right contact. For example, this means that if Alice is looking for her financial contact, then the contact inference algorithm 22 explores the nodes 12 and links 14 of the corporate social network 10 around Alice and checks to see if anyone "close" to Alice, either in terms of organizational hierarchy, location, employee-type, or other properties, has created a link to a financial contact. For instance, if Alice's manager, Robert, or if someone with an office close to Alice's office has created a link to a financial contact, then the contact inference algorithm 22 suggests that contact (or contacts) to Alice. The contact inference algorithm 22 also explains to Alice why it thinks that each suggested contact may be the correct contact by describing the path in the corporate social network 10 from Alice to the contact. Alice can then try contacting each suggested contact. If one or more of the contacts turn out to be the correct contact, then Alice confirms each correct contact to the inferencing engine 20. Even if all the suggested contacts are wrong, it is likely that one or more of those contacts are financial contacts and will know which of their colleagues is Alice's correct financial contact.

Figure 2:
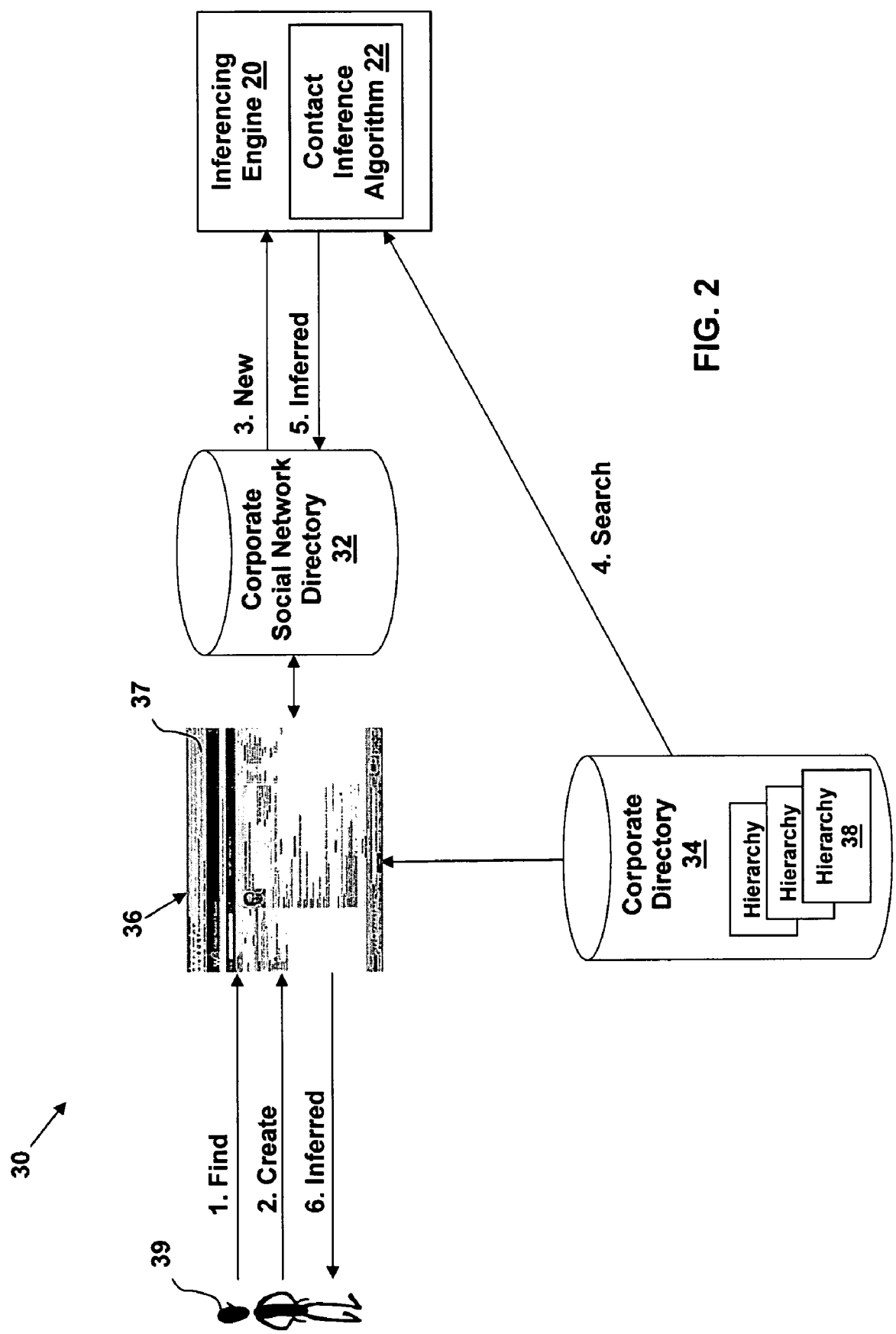
FIG. 2 depicts a contact system in accordance with an embodiment of the present invention.

A contact system 30 in accordance with an embodiment of the present invention is depicted in FIG. 2. In general, the contact system 30 includes a corporate social network directory 32, a corporate directory 34, a user interface 36, and an inferencing engine 20.

The corporate social network directory 32 includes information regarding various relationships between employees in an organization. The exact types of relationships will generally vary from organization to organization. Typical relationship types can include, for example, human resource contact, purchasing agent, legal counsel, information technology support contact, maintenance contact, etc.

Figures 3, 4:
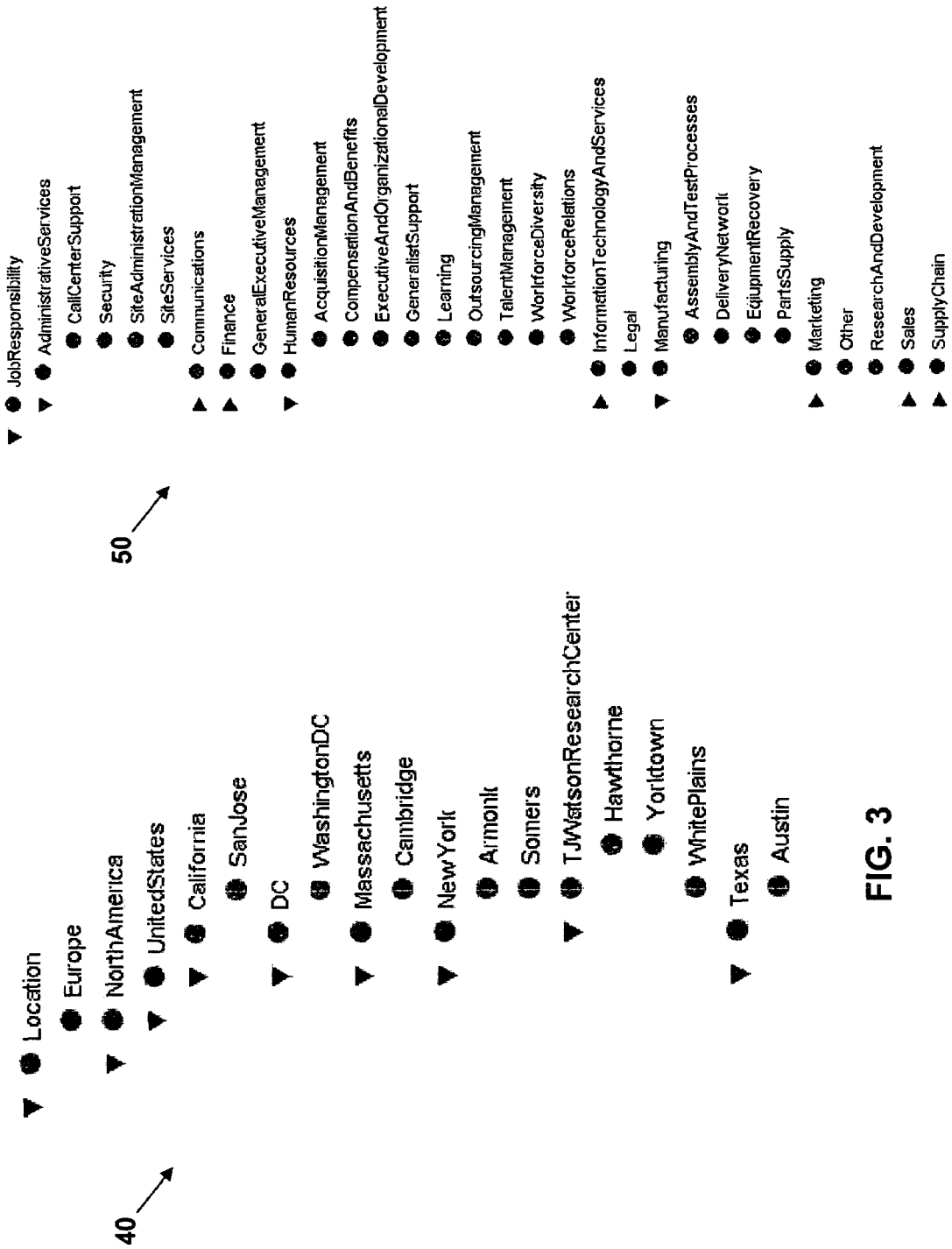
FIG. 3 depicts an illustrative location hierarchy in accordance with an embodiment of the present invention.
FIG. 4 depicts an illustrative job responsibility hierarchy in accordance with an embodiment of the present invention.

The corporate directory 34 includes information regarding various types of hierarchies 38 within the organization. Such hierarchies 38 can include, for example, location, management, employee-type, job responsibilities, etc. Some hierarchies such as management are commonly provided in an organization's corporate directory. Other hierarchies, such as location, employee-type, and job responsibilities are typically not available and must be provided in some manner (e.g., by creating ontologies defining the hierarchies). A portion of an illustrative location hierarchy 40 is illustrated in FIG. 3. A portion of an illustrative job responsibility hierarchy 50 is illustrated in FIG. 4.

Returning to FIG. 2, the user interface 36 is preferably web-based and provides a web page 37 for each employee in the organization. The web page 37 can have a portal-based architecture, where different portlets are used to display different types of personal information including, for example, contact information, expertise and skills, managerial chain, direct reports, etc. The portlet providing contact information displays the contacts of an employee. These contacts may be either explicitly provided by the employee or inferred by the contact inference algorithm 22 of the present invention. In the case of inferred contacts, the web page 37 provides a hyperlink to a page that provides an explanation as to why the particular contact was suggested by the contact inference algorithm 22. The web page 37 also allows employees to create new links to various types of contacts and modify or remove existing links. Links to contacts can be created and updated, for example, as bookmarks. Such bookmark links provide quick access to information regarding contacts (such as their address, telephone number, etc.).

As shown in FIG. 2, an employee 39 can find and create contacts using the web page 37. The web page 37 can also present inferred contacts to the employee 39, provided by the contact inference algorithm 22 of the inferencing engine 20. The inferred contacts can be generated by the contact inference algorithm 22 using, for example, new relationship information from the corporate social network directory 32 (e.g., provided in response to the creation of a new contact or acceptance of an inferred contact by an employee) and by searching the information provided by the hierarchies 38 in the corporate directory 34.

As discussed earlier, there are a number of dimensions according to which employees may be assigned. These dimensions can include, for example, management, location, and employee-type. To infer contacts to an employee, the contact inference algorithm 22 of the present invention explores the corporate social network in increasing distance from the employee along these dimensions. That is, it first checks to see if there are any other employees at a first distance who have created a link to the required type of contact. If not, it checks to see if there are any other employees at a second, greater distance who have created a link to the required type of contact, and so on. The distance from an employee A to an employee B is defined as the length of the path from employee A to the lowest common ancestor of A and B, in a particular dimension.

Figure 5:
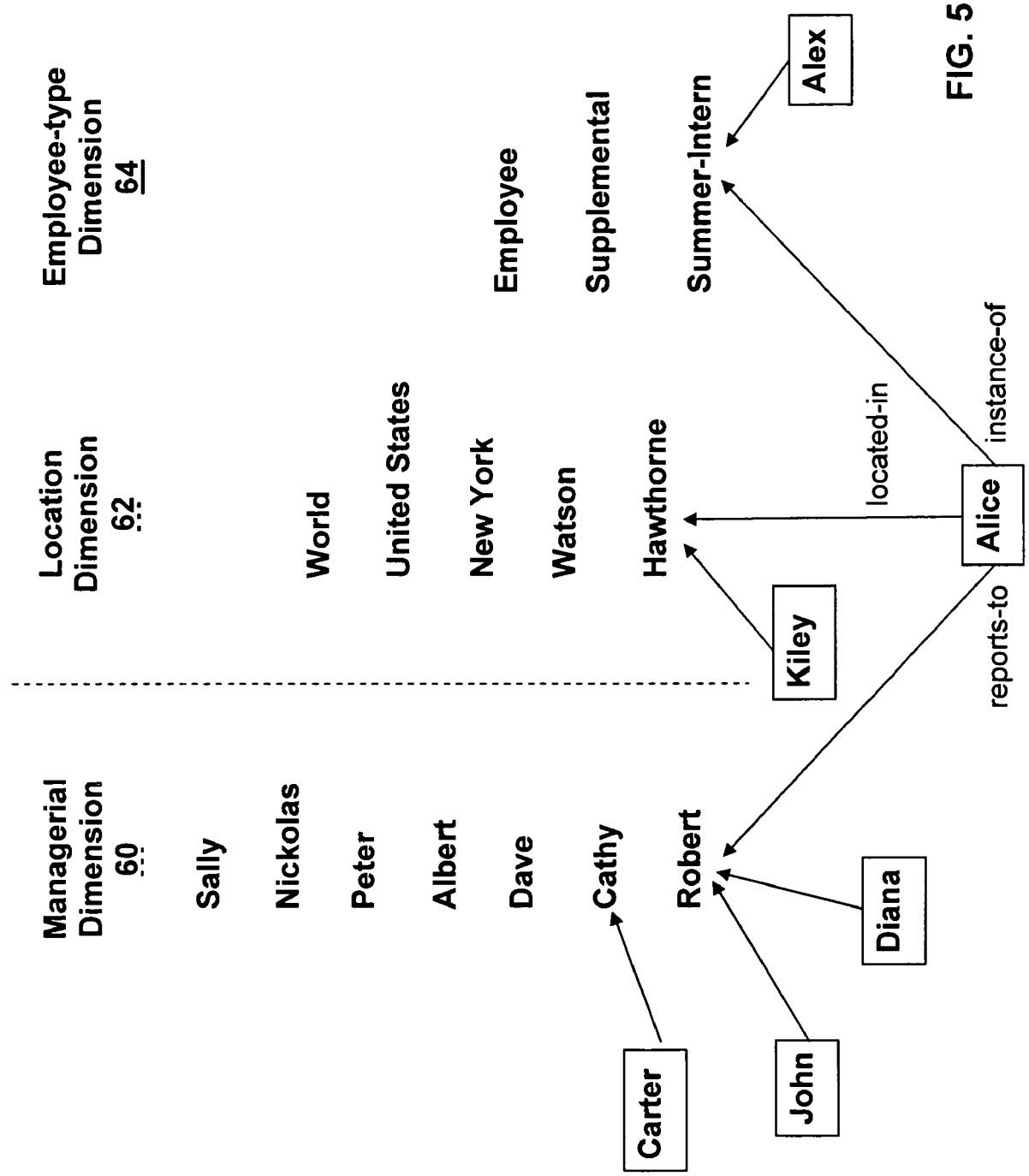
FIG. 5 depicts illustrative feature dimensions for a sample employee in accordance with an embodiment of the present invention.

FIG. 5 shows various feature dimensions for a sample employee, Alice. The three dimensions are managerial 60, location 62, and employee-type 64. Employees at a first distance x from Alice in the managerial dimension 60 include Alice's manager (Robert) and any other employees (e.g., John and Diana) who also report to the same manager (Robert) as Alice. Employees at a first distance y in the location dimension 62 include all those employees (e.g., Kiley) who work in the same location as Alice (Hawthorne). Employees at a first distance z in the employee-type dimension 64 include those all those employees (e.g., Alex) who are of the same employee-type as Alice (Summer Intern).

It can easily be seen from FIG. 5 that along a certain dimension, for example, managerial dimension 60, employees at a distance x to Alice are closer than employees at a distance of x+1 to Alice. For example, employees who report to Robert are closer to Alice than those who don't report to Robert, but report to Cathy (e.g., Carter). However, it is more difficult to compare employees across dimensions. In particular, in the absence of any domain knowledge, it is not possible to know beforehand which dimension is more important than the others in assigning contacts. Hence, the view taken by the present invention is that it is generally not possible to compare distances across two different dimensions. For example, there may be two employees who have created links to two different contacts. One of the employees sits in the same floor as another employee requesting a contact, but is in a different department, while the other employee is in the same department as the requester, but sits in a different building. Both of the contacts of these employees are equally plausible. These two employees are said to be non-dominating, since one is closer than the other in one dimension, but not in another. As such, in accordance with the present invention, both of these contacts would be suggested to the requestor. On the other hand, an employee A dominates an employee B if the distance from the requester to employee A in all dimensions is less than or equal to the distance to employee B in all dimensions and the distance to employee A is strictly less than the distance to employee B in at least one dimension. For example, if employee A is as far as employee B in the location and employee-type dimensions and closer than employee B in the management dimension, then employee A dominates employee B and the contact of employee A will be suggested to the requester.

Since some employees dominate others and are therefore closer than them, the contact inference algorithm 22 of the present invention incrementally explores the corporate social network around the employee requesting a contact. For example, if there are three dimensions, the contact inference algorithm 22 explores all employees who are at a distance (x, y, z) from the requester in the three dimensions before exploring, if necessary, employees at distances of (x+1, y, z), (x, y+1, z) and (x, y, z+1) from the requester, and so on.

In order to incrementally explore the corporate social network around an employee requesting a contact, the contact inference algorithm 22 of the present invention can use a metric based on the aggregate distance (or sum of distances) of an employee from the requestor along all dimensions. For example, if there are three dimensions, the contact inference algorithm 22 first explores employees who are at a distance (1, 1, 1) from the requestor. This corresponds to an aggregate distance of 3. If no employees having the required contact are found, the contact inference algorithm 22 next explores employees who are at distances (2, 1, 1), (1, 2, 1) and (1, 1, 2) from the requestor. These distances correspond to an aggregate distance of 4. Note that employees who are at the same aggregate distance are non-dominating, since if an employee is closer in one dimension, then that employee is farther in another dimension. The converse is not necessarily true, though. If two people are non-dominating, they need not be at the same aggregate distance from the requestor. For example, a person at distance (1,1,5) has an aggregate distance of 7, but is not dominated by a person at distance (1,2,1) who has an aggregate distance of only 4, since the first person is closer on the second dimension.

Thus, the contact inference algorithm 22 of the present invention proceeds by searching for employees who have created the required type of contact, and who are at increasing aggregate distances from the requestor. When it discovers one or more employees at a certain aggregate distance who have created the required contact, it establishes an upper bound on distance in each dimension. The search for links halts when these limits are reached. It tags these links as inferred. It also creates an explanation string that describes the path from the requestor to the contact. The requestor can view these inferred links (e.g., in web page 37, FIG. 2) and the explanations for them, and then either confirm or reject them.

An alternative contact inferencing algorithm would start with the given contact links, rather than the requesting individual. For each given link, create an inferred contact links for each person distance at a first distance along any dimension from the person creating the link. For each of these links that is non-dominated by an existing link, add it to the graph as an inferred link. Repeat the process for these newly added inferred links, until no additional non-dominated links are added. This approach can be more efficient if there are relatively few links and if the inferred links are stored rather than recomputed for display each time. In addition, this approach lends itself to an incremental algorithm. When new nodes are added or inferred links confirmed, links can be updated starting at the new link, without recomputing the entire set of inferred links.

Figure 6:
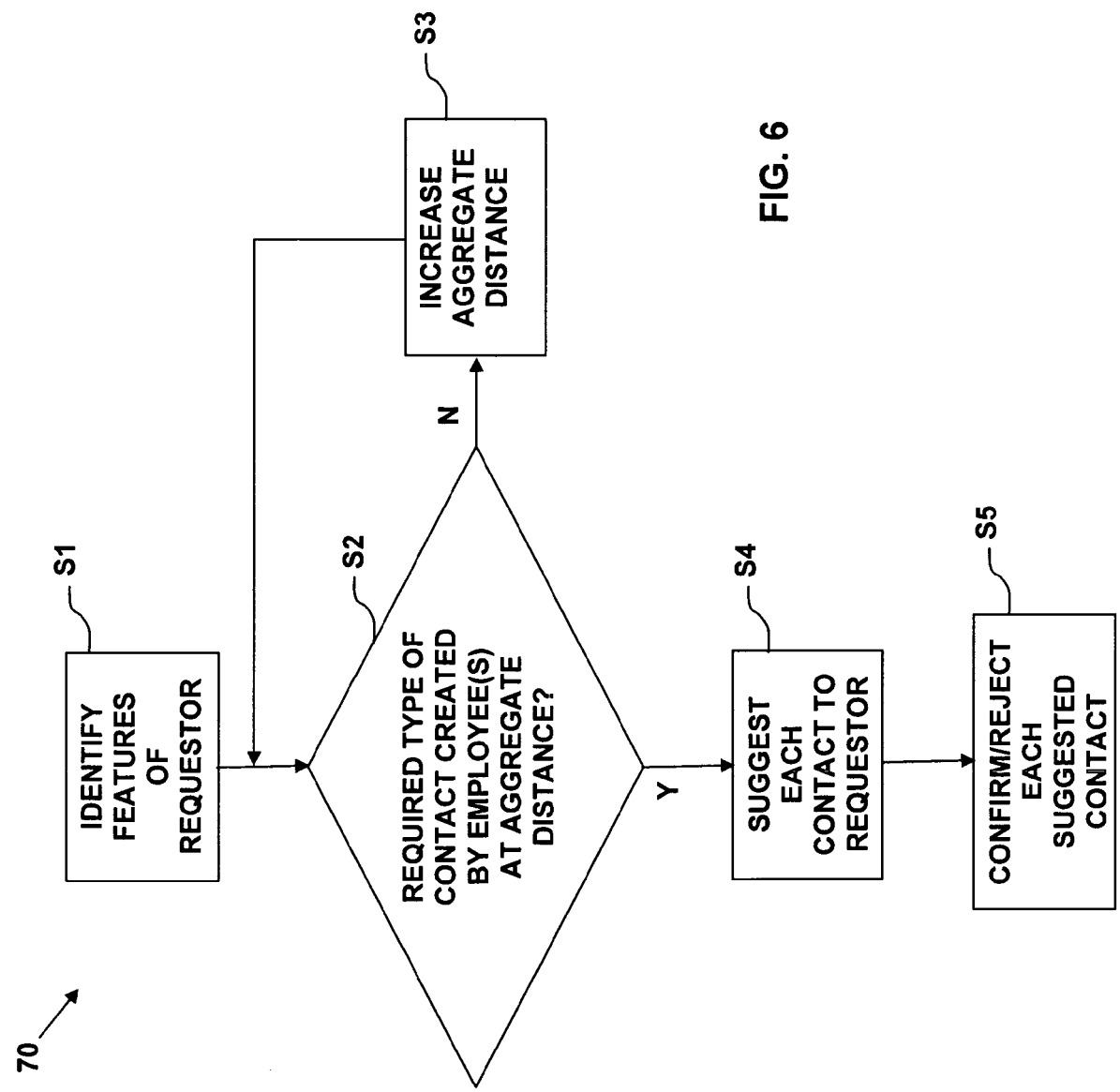
FIG. 6 depicts a flow diagram of a method in accordance with an embodiment of the present invention.

A flow diagram 70 of a method in accordance with an embodiment of the present invention is illustrated in FIG. 6.

Each employee is part of the different hierarchies (dimensions) in consideration (e.g., management, location, employee-type, etc.). The different hierarchies are the features that characterize an employee and determine the appropriate contacts for the employee. In step S1, therefore, in order to find an appropriate contact requested by an employee, the features of the requestor are identified. For example, as described above, the requestor may work at a certain location, be part of a certain department in an organization, and have a certain employee-type.

Next, the corporate social network around the requestor is explored in increasing order of aggregate distance across all dimensions to determine if any other employees have created a link to the required type of contact. This is done by determining (step S2) whether any employees at a predetermined aggregate distance from the requestor have created the required type of contact. If not, then the aggregate distance is increased (step S3) and the process is repeated. If any employees at the predetermined aggregate distance from the requester have created the required type of contact, then each contact is suggested to the requestor (step S4). The requester can then confirm/reject each suggested contact (step S5).

RDQL (RDF Query Language) queries can be used to find employees at different distances along various dimensions. In particular, queries can be made to find sets of employees who have created a contact of the required type and who are at a certain distance $d_i$ along dimension i from the requestor. The intersection of the sets obtained along different dimensions is then taken to obtain employees who are at a distance of ($d_1$, $d_2$, $d_3$, . . . ) from the requester.

A limit can be placed on the distance along each dimension that is searched, since any contacts created by employees that are beyond a certain distance are very likely to be wrong. For example, people in Europe are at a distance 5 away from the people in Yorktown Heights (according to the location hierarchy in FIG. 3), and it is unlikely that an employee in Europe shares the same contact as an employee in Yorktown Heights. The maximum distance searched along various dimensions can be set based on the hierarchy structure in the organization and/or other criteria. The distance concept used here can be generalized to levels of containment for dimensions that don't have purely hierarchical organization.

Only a few people need to actually create links to contacts in order for the present invention to reliably infer potential contacts. For example, if there is a single contact for maintenance issues in a building of 100 people, only one of these 100 people needs to have created a link to a maintenance contact for that person to be suggested as the maintenance contact for the other 99 people in the building. Even if the suggested contact(s) is not the correct one, they are probably "close" to the actual contact and can direct the employee to the right contact.

As described above, the present invention can be used to find possible contacts based on the type of contact and on the features of the employee. The present invention, however, also allows people to create new job responsibilities to describe their contacts. This allows a distributed, yet collaborative ontology creation and maintenance process.

As depicted in FIG. 4, the jobs of different contacts can also be organized hierarchically—e.g., there may be different subclasses of HR, finance, etc. For inferring the potential contacts of the person, the job-functionality hierarchy is handled a little differently from the location, managerial and employee-type hierarchies—the query is for a certain kind of contact in the job functionality hierarchy. The important concept used here is that inexact matches may also be applicable. For example, if the query is for Accounting contacts, then, apart from Accounting contacts created by other people, even Financial contacts, Travel Accounting contacts and, possibly, Audit contacts may be useful. The present invention uses a heuristic to rank contacts based on how they relate to one another in the job responsibility hierarchy. Various classes in the ontology can be ranked, for example, in the following order based on how they relate to the query class:

1. Exact matches are ranked highest;
2. Classes subsumed by the query class;
3. Class that subsumes the query class; and
4. Siblings of the query class.

Figure 7:
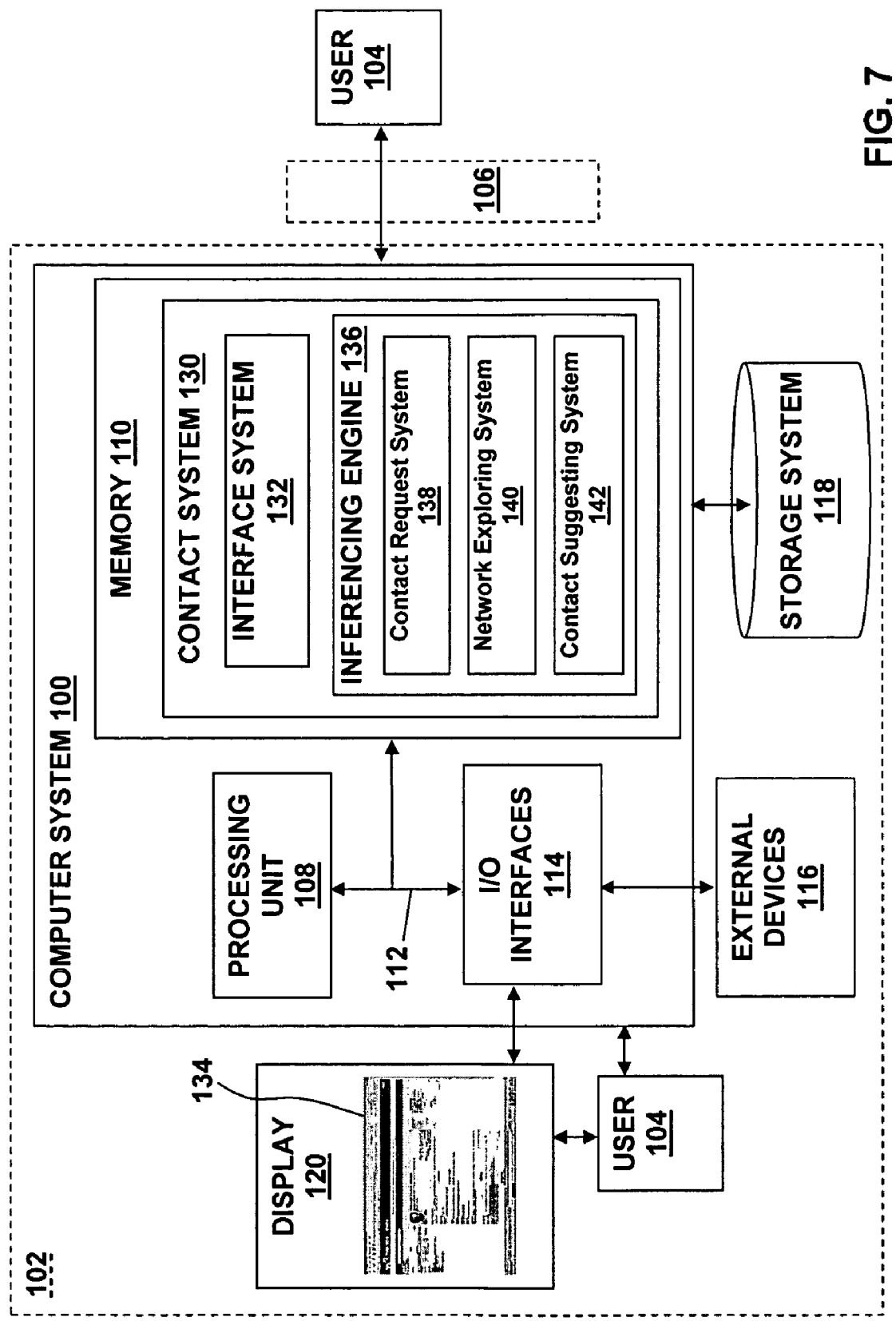
FIG. 7 depicts an illustrative computer system for implementing embodiment(s) of the present invention.

A computer system 100 for enhancing collaboration using a corporate social network to infer contacts in accordance with an embodiment of the present invention is depicted in FIG. 7. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides a service for enhancing collaboration using a corporate social network to infer a contact in accordance with the present invention. It should be appreciated that a user 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that can utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage systems 118. In general, processing unit 108 executes computer program code, such as contact system 130, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprise two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 can comprise a single processing unit, or can be distributed across one or more processing units in one or more locations, e.g., on a client and server. Similarly, memory 110 and/or storage system(s) 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, communication systems, cache memory, etc.) not shown in FIG. 7 can be included in computer system 100. However, if computer system 100 comprises a handheld device or the like, it is understood that one or more external devices/resources 116 (e.g., display 120) and/or one or more storage system(s) 118 can be contained within computer system 100, and not externally as shown.

Storage system(s) 118 can be any type of system (e.g., a database) capable of providing storage for information under the present invention. Such information can include, for example, corporate directories, corporate social network directories, contact information, hierarchies, etc. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Moreover, although not shown, computer systems operated by user 104 can contain computerized components similar to those described above with regard to computer system 100.

Shown in memory 110 (e.g., as a computer program product) is a contact system 130 for enhancing collaboration using a corporate social network to infer contacts in accordance with embodiment(s)s of the present invention. The contact system 130 generally includes an interface system 132 for providing and displaying a web interface 134, where employees can manage their contacts, and an inferencing engine 136 for inferring different types of contacts for employees, as described above. The inferencing system 136 includes a contact request system 138 for receiving a request for a contact from an employee (e.g., user 104), a network exploring system 140 for exploring the corporate social network around the requestor in increasing order of aggregate distance across all dimensions to determine if any other employees have created a link to the required type of contact, and a contact suggestion system 142 for suggesting contacts found by the exploring system 140 to the requestor.

The present invention can be offered as a business method on a subscription or fee basis. For example, one or more components of the present invention can be created, maintained, supported, and/or deployed by a service provider that offers the functions described herein for customers. That is, a service provider can be used to provide a service for enhancing collaboration using a corporate social network to infer contact, as described above.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk—read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for inferring a contact, comprising steps executed by a processor and a memory operatively coupled to the processor, wherein the memory stores program instructions executable for:
   providing a social network for an organization, the social network including a plurality of nodes and links, each node representing a member of the organization and each link representing a relationship between a pair of the nodes;
   receiving a request by a requesting member of the organization for a required type of contact;
   inferring a dominating contact to the requesting member by searching the social network in increasing distance along a plurality of dimensions from the node representing the requesting member, wherein each dimension comprises a different hierarchy in the social network, wherein the distance comprises an aggregate distance across the plurality of dimensions, wherein the dominating contact is a shorter distance from one of the nodes than a non-dominating contact in all of the plurality of dimensions, and wherein the dominating contact is a strictly shorter distance from the one of the nodes than the non-dominating contact in at least one of the plurality of dimensions;
   establishing an upper bound on the distance in each of the plurality of dimensions when a required type of dominating contact is discovered; and
   displaying the inferred dominating contact to the requesting member.

2. The method of claim 1, wherein the searching of the social network further comprises:
   searching the social network for a member of the organization, the member having a link to the required type of dominating contact.

3. The method of claim 1, wherein at least one of the plurality of dimensions is selected from the group consisting of management, location, member-type, and job responsibility.

4. The method of claim 1, further comprising:
   accepting the inferred dominating contact; and
   updating the social network by adding a link from the node representing the requesting member to a node representing the inferred dominating contact.

5. The method of claim 1, further comprising:
   inferring a plurality of non-dominating contacts, including the non-dominating contact, to the requesting member;
   accepting one of the plurality of non-dominating contacts; and
   updating the social network by adding a link from the node representing the requesting member to a node representing the accepted, non-dominating contact.

6. A computer-implemented system for inferring a contact, comprising:
   at least one computer, including:
   a social network including a plurality of nodes and links, each node representing a member of an organization and each link representing a relationship between a pair of the nodes;
   a system for receiving a request by a requesting member of the organization for a required type of contact;
   a system for inferring a dominating contact to the requesting member by searching the social network in increasing distance along a plurality of dimensions from the node representing the requesting member, wherein each dimension comprises a different hierarchy in the social network, wherein the distance comprises an aggregate distance across the plurality of dimensions, wherein the dominating contact is a shorter distance from one of the nodes than a non-dominating contact in all of the plurality of dimensions, and wherein the dominating contact is a strictly shorter distance from the one of the nodes than the non-dominating contact in at least one of the plurality of dimensions; and
   a system for establishing an upper bound on the distance in each of the plurality of dimensions when a required type of dominating contact is discovered.

7. The system of claim 6, wherein the system for searching the social network further comprises:
   a system for searching the social network for a member of the organization, the member having a link to the required type of dominating contact.

8. The system of claim 6, wherein at least one of the plurality of dimensions is selected from the group consisting of management, location, member-type, and job responsibility.

9. The system of claim 6, further comprising:
   a system for accepting the inferred dominating contact; and
   a system for updating the social network by adding a link from the node representing the requesting member to a node representing the inferred dominating contact.

10. The system of claim 6, further comprising:
    a system for inferring a plurality of non-dominating contacts, including the non-dominating contact, to the requesting member;
    a system for accepting one of the plurality of non-dominating contacts; and
    a system for updating the social network by adding a link from the node representing the requesting member to a node representing the accepted, non-dominating contact.

11. A program product stored on a computer readable medium for inferring a contact, the computer readable medium comprising program code for performing the steps of:
    providing a social network for an organization, the social network including a plurality of nodes and links, each node representing a member of the organization and each link representing a relationship between a pair of the nodes;
    receiving a request by a requesting member of the organization for a required type of contact;
    inferring a dominating contact to the requesting member by searching the social network in increasing distance along a plurality of dimensions from the node representing the requesting member, wherein each dimension comprises a different hierarchy in the social network, wherein the distance comprises an aggregate distance across the plurality of dimensions, wherein the dominating contact is a shorter distance from one of the nodes than a non-dominating contact in all of the plurality of dimensions, and wherein the dominating contact is a strictly shorter distance from the one of the nodes than the non-dominating contact in at least one of the plurality of dimensions; and
    establishing an upper bound on the distance in each of the plurality of dimensions when a required type of dominating contact is discovered.

12. The program product of claim 11, further comprising program code for performing the steps of:

accepting the inferred dominating contact; and updating the social network by adding a link from the node representing the requesting member to a node representing the inferred dominating contact.

13. A contact inferring method, comprising steps executed by a processor and a memory operatively coupled to the processor, wherein the memory stores program instructions executable for:

providing a corporate social network including a plurality of nodes and links, each node representing a member of the organization and each link representing a relationship between a pair of the nodes in one of a plurality of different dimensions, wherein each dimension comprises a different hierarchy in the corporate social network;

receiving a request by a requesting employee of the organization for a required type of contact;

inferring at least one dominating contact to the requesting employee by searching the corporate social network in increasing distance along the plurality of different dimensions from the node representing the requesting employee, wherein the distance comprises an aggregate distance across the plurality of dimensions wherein the at least one dominating contact is a shorter distance from one of the nodes than a non-dominating contact in all of the plurality of dimensions, and wherein the at least one dominating contact is a strictly shorter distance from the one of the nodes than the non-dominating contact in at least one of the plurality of dimensions;

establishing an upper bound on the distance in each of the plurality of dimensions when a required type of dominating contact is discovered;

accepting an inferred dominating contact; and updating the corporate social network by adding a link from the node representing the requesting employee to a node representing the accepted inferred dominating contact.

14. The method of claim 13, wherein the plurality of dimensions are selected from the group consisting of management, location, member-type, and job responsibility.

* * * * *